United States Patent
Carson

(10) Patent No.: US 11,181,183 B2
(45) Date of Patent: Nov. 23, 2021

(54) MULTIFUNCTION BAFFLES AND WORK EQUIPMENT TRANSMISSIONS CONTAINING THE SAME

(71) Applicant: Deere & Company, Moline, IL (US)

(72) Inventor: William W. Carson, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 233 days.

(21) Appl. No.: 16/545,100

(22) Filed: Aug. 20, 2019

(65) Prior Publication Data
US 2021/0054919 A1 Feb. 25, 2021

(51) Int. Cl.
*F16H 1/06* (2006.01)
*F16H 1/20* (2006.01)
(Continued)

(52) U.S. Cl.
CPC ......... *F16H 57/0423* (2013.01); *E02F 9/202* (2013.01); *F16H 1/20* (2013.01); *F16H 57/043* (2013.01); *F16H 57/0434* (2013.01)

(58) Field of Classification Search
CPC ............... F16H 57/0423; F16H 57/043; F16H 57/0434; F16H 57/0421; F16H 57/042
See application file for complete search history.

(56) References Cited

U.S. PATENT DOCUMENTS

| | | | |
|---|---|---|---|
| 2,602,522 A | * | 7/1952 | Roos ................... F16H 57/0421 184/11.1 |
| 8,122,787 B2 | | 2/2012 | Simpson et al. |

(Continued)

FOREIGN PATENT DOCUMENTS

| | | |
|---|---|---|
| DE | 612984 C | 5/1935 |
| DE | 102006008821 A1 | 8/2007 |

(Continued)

OTHER PUBLICATIONS

John Deere, Funk DF150 Powershift Transmission Industrial Drivetrain Transmission Specifications Brochure, Jan. 2017.
(Continued)

*Primary Examiner* — Jake Cook
(74) *Attorney, Agent, or Firm* — Klintworth & Rozenblat IP LLP

(57) ABSTRACT

Multifunction baffles and work equipment transmissions containing multifunction baffles are provided. In various embodiments, the work equipment transmission includes a gearbox housing having an outlet port, a sump retaining a lubricant reservoir, and a first gear rotatably mounted in the gearbox housing such that a portion of the first gear is located below an upper surface of the lubricant reservoir. A multifunction baffle, which is installed within the gearbox housing, includes a circumferential shroud wall and an integrated suction tube. The integrated suction tube includes, in turn, a suction tube body integrally formed with the circumferential shroud wall, an inlet end portion in fluid communication with the lubricant reservoir, an outlet end portion in fluid communication with the outlet port, and a lubricant flow passage within the suction tube body and through which the lubricant is drawn from the lubricant reservoir.

19 Claims, 11 Drawing Sheets

(51) Int. Cl.
*F16H 57/04* (2010.01)
*E02F 9/20* (2006.01)

(56) References Cited

U.S. PATENT DOCUMENTS

| | | | |
|---|---|---|---|
| 2010/0101351 A1* | 4/2010 | Lafer | F16H 57/0421 |
| | | | 74/467 |
| 2017/0030457 A1* | 2/2017 | Hotait | F16H 57/0463 |
| 2017/0102066 A1* | 4/2017 | Lee | F16H 57/0423 |
| 2017/0261092 A1* | 9/2017 | Ijichi | F16H 57/0489 |
| 2018/0106357 A1 | 4/2018 | Kawakami et al. | |
| 2018/0106358 A1 | 4/2018 | Kawakami et al. | |
| 2019/0003570 A1 | 1/2019 | Graves et al. | |

FOREIGN PATENT DOCUMENTS

| | | |
|---|---|---|
| EP | 1128095 A1 | 8/2001 |
| JP | 2012102813 A | 5/2012 |
| JP | 2013194891 A | 9/2013 |
| JP | 2018063031 A | 4/2018 |
| JP | 2018063034 A | 4/2018 |

OTHER PUBLICATIONS

John Deere, Funk DF250 Powershift Transmission Industrial Drivetrain Transmission Specifications Brochure, Jan. 2017.
ZF Friedrichshafen AG, Stepless Into the Future—ZF cPower—CVT Technology Brochure, undated, admitted prior art.
German Search Report issued in counterpart application No. 102020209066.1 dated Feb. 11, 2021 (12 pages).

\* cited by examiner

MULTIFUNCTION BAFFLES AND WORK EQUIPMENT TRANSMISSIONS CONTAINING THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to multifunction baffles for usage within transmissions.

BACKGROUND OF THE DISCLOSURE

The transmissions of motor graders and other work equipment often include actively-lubricated gear trains installed within gearbox housings. The gearbox housing may include a sump, which retains a body of liquid lubricant or "lubricant reservoir." During operation of the work equipment, the liquid lubricant (typically oil) is withdrawn from the lubricant reservoir through a suction tube. To further ensure low friction operation of the transmission gearbox, a baffle may be disposed around one or more of the gears or corresponding shafts within the gearbox housing. When present, the baffle may help maintain proper spacing between the enclosed gear(s), shaft, and neighboring components within the transmission as may be particularly useful in the context of work equipment.

SUMMARY OF THE DISCLOSURE

Work equipment (e.g., vehicle) transmissions containing multifunction baffles are provided. In various embodiments, the work equipment transmission includes a gearbox housing having an outlet port, a sump retaining a lubricant reservoir, and a first gear rotatably mounted in the gearbox housing such that a portion of the first gear is located below an upper surface of the lubricant reservoir. A multifunction baffle, which is installed within the gearbox housing, includes a circumferential shroud wall and an integrated suction tube. The integrated suction tube includes, in turn, a suction tube body integrally formed with the circumferential shroud wall, an inlet end portion in fluid communication with the lubricant reservoir, an outlet end portion in fluid communication with the outlet port, and a lubricant flow passage within the suction tube body and through which the lubricant is drawn from the lubricant reservoir.

In other embodiments, the work equipment transmission includes a gearbox housing having an outlet port, a sump within the gearbox housing and retaining a lubricant reservoir when filled with a lubricant, and a first gear mounted in the gearbox housing for rotation about a first axis. A portion of the first gear is located below an upper surface of the lubricant reservoir. A multifunction baffle is further installed within the gearbox housing. The multifunction baffle includes a circumferential shroud wall extending into the lubricant reservoir and at least partially around an outer periphery of the first gear. An annular endwall partially encloses a first end portion of the circumferential shroud wall, while an annular cover or adapter piece is matingly inserted into a second, opposing end portion of the circumferential shroud wall. A tubular collar further projects from the annular endwall in an axial direction opposite the circumferential shroud wall.

Multifunction baffles for usage within work equipment transmissions are further provided. The work equipment transmission may include gearbox housing having an outlet port, a sump within the gearbox housing and retaining a lubricant reservoir when filled with a lubricant, and a first gear mounted in the gearbox housing for rotation about a first axis at a location partially below an upper surface of the lubricant reservoir. In an implementation, the multifunction baffle includes a circumferential shroud wall extending into the lubricant reservoir and at least partially around an outer periphery of the first gear when the multifunction baffle is installed within the work equipment transmission. The multifunction baffle further includes an integrated suction tube having a suction tube body integrally formed with the circumferential shroud wall. The integrated suction tube also includes an inlet end portion and an inlet end portion in fluid communication with the lubricant reservoir and with the outlet port, respectively, when the multifunction baffle is installed within the work equipment transmission. A lubricant flow passage, through which the lubricant is drawn the lubricant reservoir, extends within the suction tube body from the inlet end portion to the outlet end portion.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
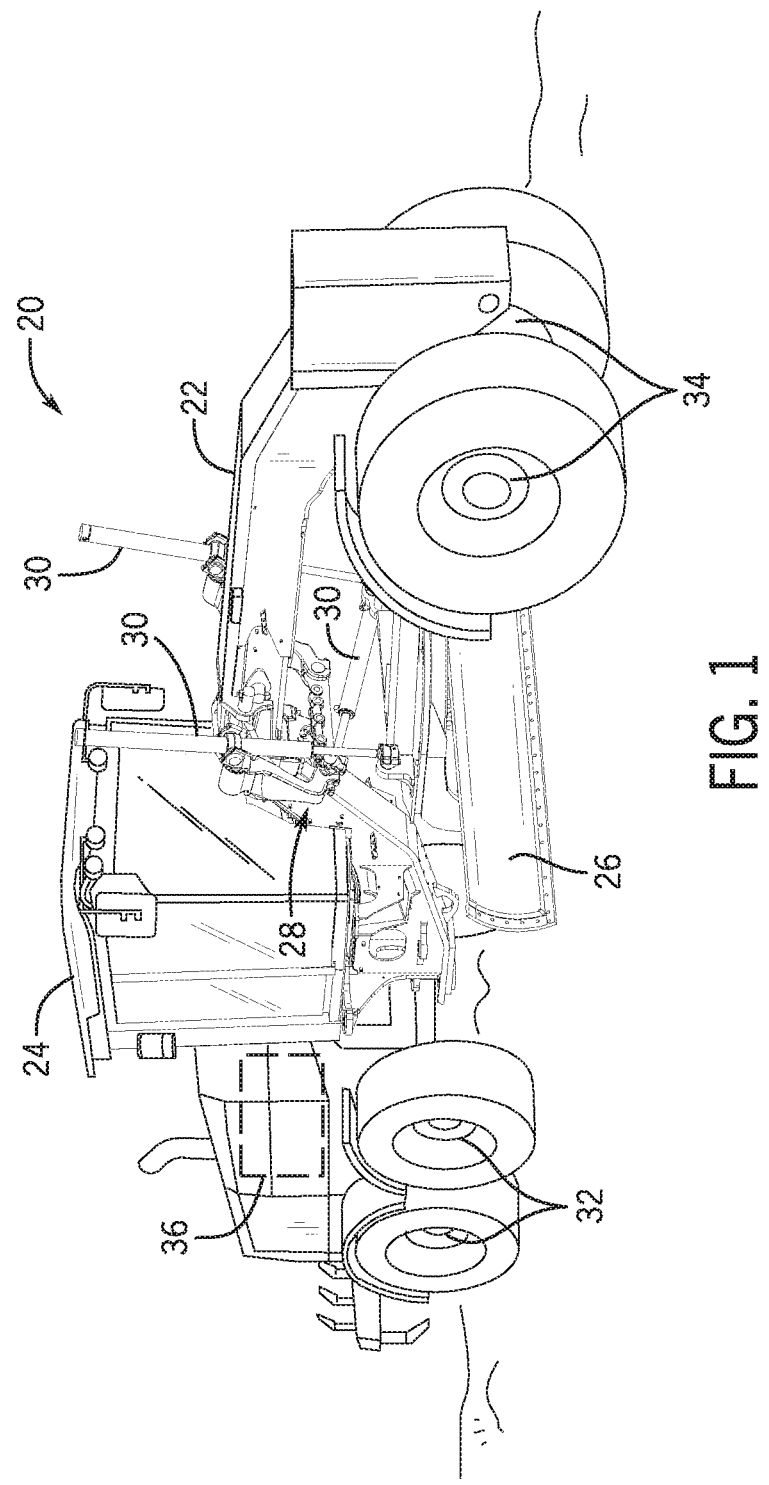
FIG. 1 is a perspective view of a work equipment (here, a motor grader) containing a transmission into which embodiments of the multifunction baffle are usefully incorporated, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed briefly above, work equipment (e.g., vehicle) transmission gearboxes are commonly equipped with baffles to, for example, reduce windage. Such baffles are associated with various limitation. Further, the transmission gearbox of a work equipment may be produced to include certain features, such as metal plates affixed to the interior walls of the gearbox housing with fasteners, which serve as dams or guides for directing lubricant flow toward regions of the transmission in critical need of lubrication. While generally effective at providing this functionality, such discrete lubricant-guidance features increase the overall part count, cost, and complexity of the work equipment transmission.

An ongoing demand thus exists for the provision of work equipment (e.g., vehicle) transmission gearboxes having improved lubrication performance characteristics, reduced part counts, decreased manufacturing costs, and other desirable characteristics. In satisfaction of this demand, work equipment transmission gearboxes having such desirable characteristics are provided herein and realized, at least in part, through the strategic incorporation of one or more unique, multifunction baffles into the gearbox housing of the transmission gearbox. As described below, embodiments of the multifunction baffle concurrently provide multiple functions to optimize transmission lubrication, maintain critical part spacing, and enhance other operational aspects of the transmission gearbox; e.g., reduce windage. Depending upon implementation, such functions may include the provision of an integrally-formed suction tube for drawing a liquid lubricant, such as oil, from a lubricant reservoir and for delivering the lubricant through an outlet port provided in the gearbox housing. The suction tube may further include certain features, such as a molded resilient spring fingers, which provide a robust seal and ensure proper registration of the outlet end of the suction tube into the outlet port, while negating or reducing reliance on fasteners. The interface between the section tube and the outlet port may also serve as an anti-rotation feature deterring undesired rotation of the baffle within the transmission in at least some embodiments.

In addition to the suction tube, embodiments of the multifunction baffle may include a circumferential shroud wall extending at least partially around the outer periphery of the gear or gears about which the baffle is positioned. The circumferential shroud wall may be dimensioned to provide a relatively tight (low clearance) fit around the enclosed gear(s) such that pooling of lubricant within the shroud interior is minimized to reduce windage and improve the performance of the work equipment transmission. Further, the entirety or a substantial portion of the suction tube of the multifunction baffle may be integrally formed with the circumferential shroud wall as a single piece in some embodiments; e.g., via molding, additive manufacturing, or utilizing another fabrication technique. So too may various other features of the multifunction baffle be integrally formed as features or portions of a single or unitary piece including, but not limited to, any combination of the below-mentioned retention tabs, tubular extension or collar, and annular endwall, as well as the above-mentioned spring fingers (when present). Further, in certain implementations, at least one discretely-fabricated tubular piece (herein, the "suction tube liner") may be embedded within the body of the integrated suction tube to further promote high integrity sealing of the suction tube. For example, in one possible approach, the suction tube body, the circumferential shroud wall, and other baffle features may be produced as a single molded piece, which is over-molded around the suction tube liner. Not only may this impart the multifunction baffle with a structurally robust construction at a reduced manufacturing cost, but such a construction may further enhance sealing of the suction tube to reduce, if not eliminate air entrapment in the lubricant flow extracted through the suction tube.

Embodiments of the multifunction baffle may provide other benefits, as well. For example, surfaces of the circumferential shroud wall or the multifunction baffle, generally, may serve as dams or guideways directing lubricant flow toward critical regions of the transmission gearbox. Additionally or alternatively, embodiments of the multifunction baffle may include an interchangeable cover or adapter piece enhancing the adaptability or versatility of the baffle for usage across multiple work equipment transmission platforms. The interchangeable cover piece may be freely replaced by other cover pieces of varying dimensions, with each cover piece sized for usage in different transmission gearboxes. In various embodiment, an inner circumferential groove may be provided around an inner peripheral of the baffle's circumferential shroud wall, and the outer peripheral edges of the cover pieces may each be dimensioned to matingly engaging into the inner circumferential groove by, for example, press-fit engagement. The appropriately sized cover piece can therefore be selected based upon the particular type of work equipment transmission in which the multifunction baffle is desirably installed to provide a versatile baffle system or kit. Further description of such an adaptable baffle system is set-forth below in connection with FIG. 11. First, however, an example embodiment of the multifunction baffle and a work equipment transmission suitably containing the multifunction baffle is described in conjunction with FIGS. 1-10.

Example Embodiment of a Work Equipment and a Work Equipment Transmission in which the Multifunction Baffle May be Utilized FIG. 1 is a perspective view of work equipment, here a work vehicle in the form of a motor grader 20, having an actively-lubricated transmission gearbox in which embodiments of the below-described multifunction baffle may be incorporated. In the illustrated example, the motor grader 20 includes a chassis or main frame 22, an operator station 24, and a grader blade 26 suspended beneath the main frame 22. The grader blade 26 may be connected to the main frame 22 by a grader blade suspension linkage 28 including various combinations of structural elements (e.g., bell cranks, crossbars, swivel connectors, etc.) and controllably moved utilizing any number of actuators, such as hydraulic cylinders 30. Wheels 32, 34 are mounted to the main frame 22 and selectively driven by a motor contained within the motor grader 20. Specifically, four drive wheels 32 (two of which can be seen in FIG. 1) are mounted to the trailing portion or "rear unit" of the motor grader 20, while two steered wheels 34 are mounted to the leading portion or "forward unit" of the motor grader 20.

The motor grader 20 further includes at least one actively-lubricated transmission gearbox. For example, the transmission gearbox may be deployed in the main frame 22 of the motor grader 20 at a location behind the operator station 24, generally in the region identified by dashed box 36 in FIG. 1. During operation, the work equipment transmission gearbox transmits rotary motion from the engine of the motor grader 20 to other driven components (e.g., the drive wheels 32) of the motor grader 20, while providing a desired mechanical reduction between the engine output and the driven components. To help ensure the proper operation of the work equipment transmission gearbox over extended periods of time, the transmission gearbox is actively lubricated through the circulation of a selected lubricant, typically oil, which may be filtered and otherwise conditioned (e.g., cooled) to maintain lubricant quality. To further ensure proper gearbox operation despite the relatively harsh, high vibratory environment in which the motor grader 20 may operate, the work equipment transmission gearbox may also contain one or more baffles, which help maintain proper spacing between static and rotational components of the transmission. In accordance with embodiments of the present disclosure, the work equipment transmission of the motor grader 20 contains at least one multifunction baffle, which not only provides such a part-spacing function, but which further provides other functions (e.g., lubricant conduction and possibly lubricant distribution functionalities), as discussed more fully below in connection with FIGS. 2-10.

Figure 2:
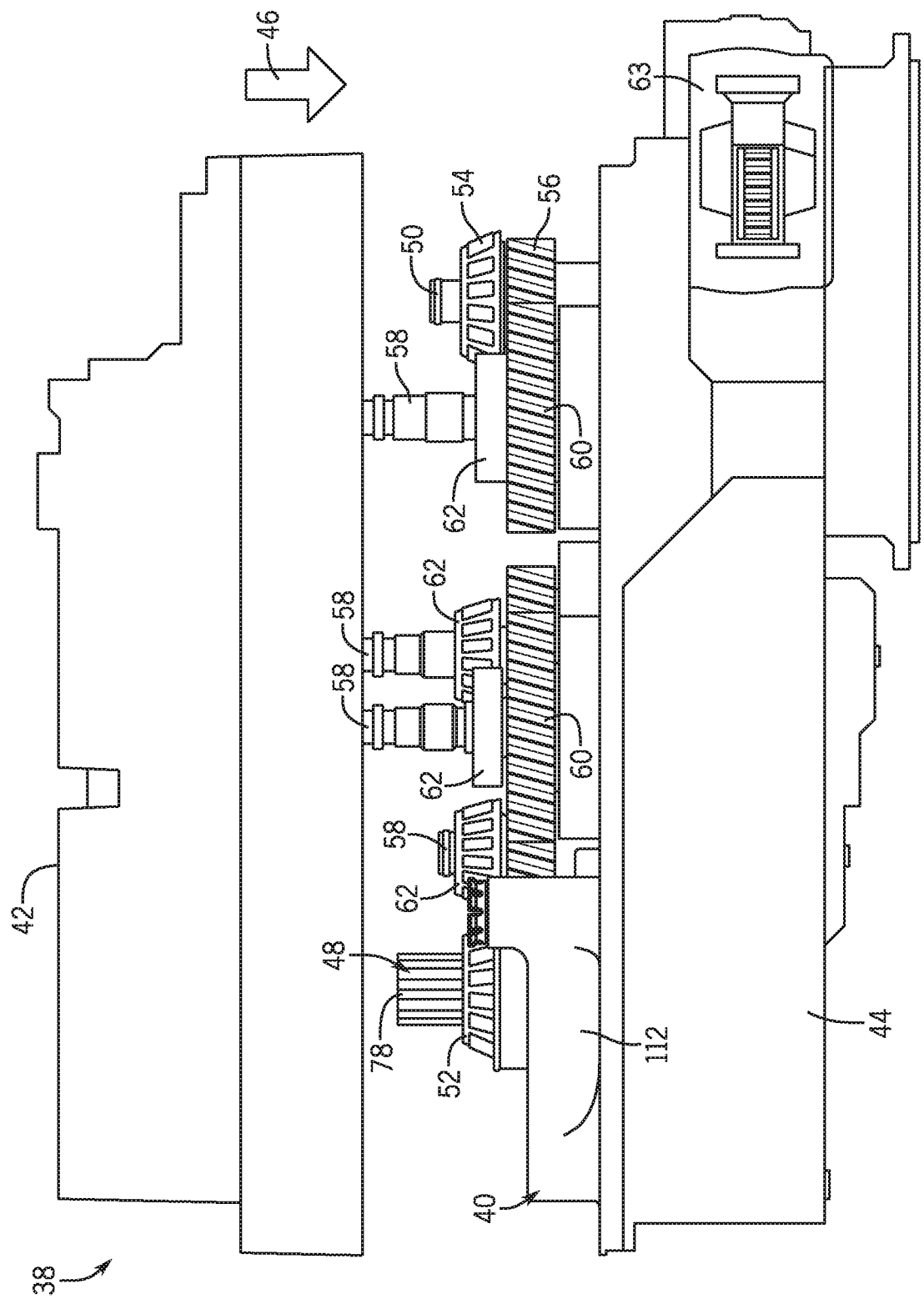
FIG. 2 is a side view of a transmission gearbox containing an example multifunction baffle, as depicted during lowering of a rear or aft housing piece included in the gearbox housing during assembly.

Turning to FIG. 2, there is shown an example transmission gearbox 38 suitable for usage within a work equipment, such as the motor grader 20 described above in connection with FIG. 1. The work equipment transmission gearbox 38 includes a multifunction baffle 40 and further contains various gears, shafts, bearings, and other such components arranged within a gearbox housing 42, 44. The gearbox housing 42, 44 is principally assembled from two mating halves or sections in the illustrated example: a rear or aft housing piece 42 and a front or forward housing piece 44. The terms "aft" and "forward," as appearing herein, are defined with respect to the work equipment in which the transmission gearbox 38 is incorporated, noting that the gearbox 38 is seen from a separate rotated, side view in FIG. 2. The work equipment transmission gearbox 38 is shown with the aft housing piece 42 slightly offset or spaced from the forward housing piece 44 to reveal the internal components within the gearbox housing 42, 44. During assembly, the various components contained within the transmission gearbox 38 may be initially installed within the forward housing piece 44. The aft housing piece 42 may then be lowered onto the housing piece 44, as indicated by arrow 46. Finally, the housing pieces 42, 44 may be joined together utilizing, for example, bolts or other fasteners.

In the illustrated example, the work equipment transmission gearbox 38 includes a splined output shaft 48 and an input shaft 50. The splined output shaft 48 projects from the multifunction baffle 40 and is supported by a number of rolling element bearings 52, only one of which can be seen in FIG. 2. Similarly, the input shaft 50 is supported by multiple bearings 54 to facilitate the rotation of the input shaft 50 and a supported gear 56, which is joined to the shaft 50 in a rotationally-fixed relationship, while being permitted to rotate relative to the static components of the gearbox 38. Various additional shafts 58 and gears 60 are mechanically linked between the input shaft 50 and the output shaft 48, with the rotation of the shafts 58 and the gears 60 facilitated by several rolling element bearings 62. The rotational components of the work equipment transmission gearbox 38 may be arranged into a number of stages, with the output shaft 48 serving as a seventh stage gearing output in the illustrated example. In further embodiments, various other gear train configurations are possible, noting that the illustrated multifunction baffle 40 can be utilized within numerous different types of work equipment transmissions without limitation.

Figure 3:
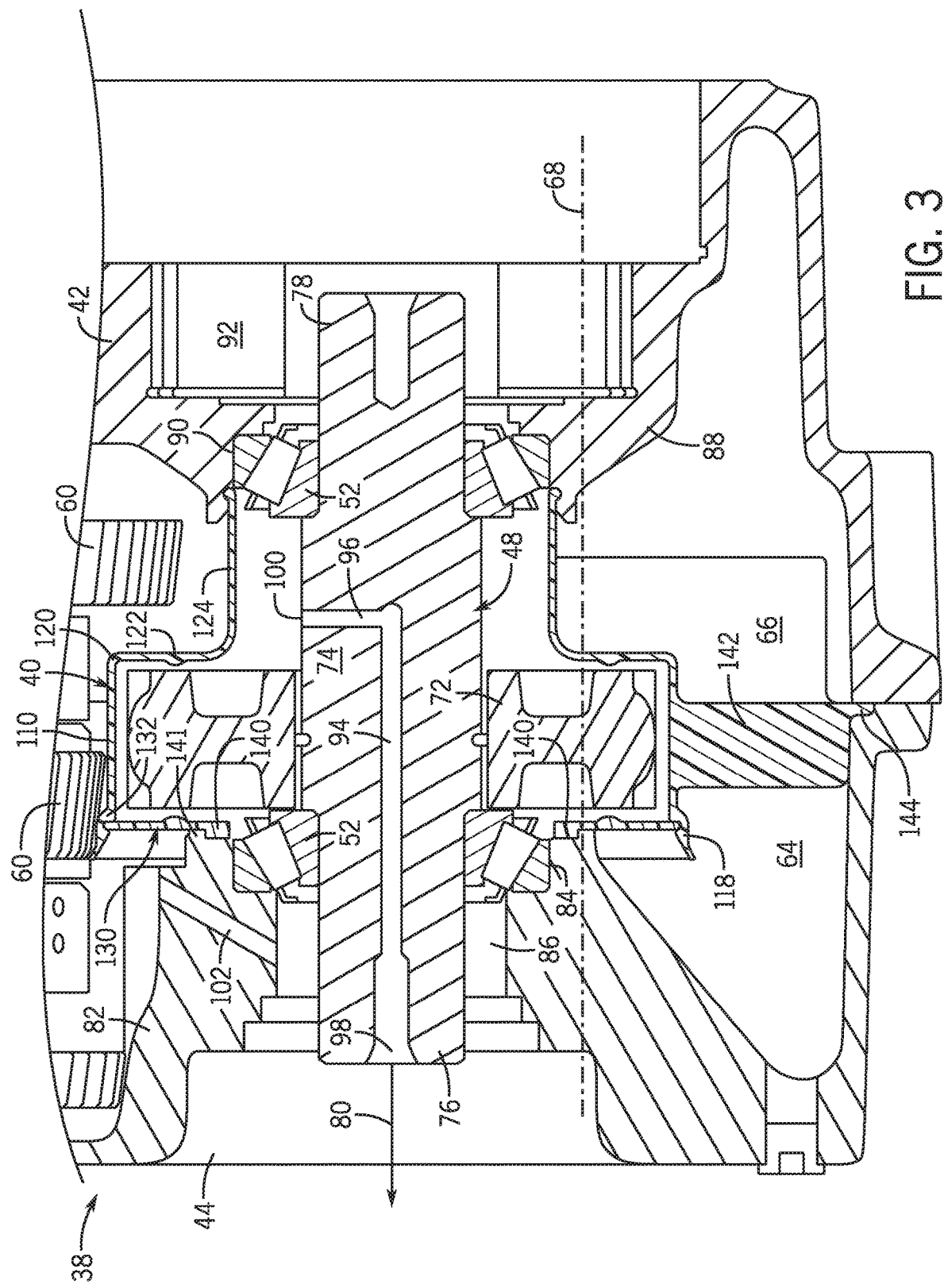
FIG. 3 is a cross-sectional view of the transmission gearbox (partially shown) and the example multifunction baffle, as taken along a vertical section plane through a mid-portion of the baffle.

FIG. 3 illustrates a portion of the transmission gearbox 38 in cross-section along a section plane bisecting the splined output shaft 48 along its length. Referring jointly to FIGS. 2 and 3, a lower portion of the transmission gearbox 38 contains a sump 64, 66; that is, a fluid-tight chamber or compartment in which a body of oil or another liquid lubricant is retained. The sump 64, 66 is defined by a lower cavity 64 provided in the forward housing piece 44 and a lower cavity 66 provided in the aft housing piece 42. When assembled, the housing pieces 42, 44 abut to form a fluid-tight seal enabling the sump 64, 66 to retain a body of lubricant or "lubricant reservoir." Any number and type of gaskets or other sealing elements may be disposed between the housing pieces 42, 44 to minimize, if not eliminate leakage at this interface. Following assembly of the transmission gearbox 38, a selected lubricant is injected into the interior of the gearbox 38 and collects within the sump 64, 66 to form the lubricant reservoir. The volume of lubricant introduced into the transmission gearbox 38 will vary; however, by way of example, dashed line 68 in FIG. 3 may represent a fill line of the transmission gearbox 38 and, therefore, may correspond to an upper surface of the lubricant reservoir held within the sump 64, 66 when filled with a selected lubricant. The dashed line 68 is only a general representation of the location of the upper surface of the lubricant reservoir, noting that the volume of the lubricant reservoir (and thus the location of the upper surface) will vary depending upon the volume of lubricant held within the gearbox 38 at a given point in time and the operational status of the transmission. For completeness, an example of the lubricant reservoir is further shown in FIG. 4 (described below) and identified by reference numeral "70."

An output gear 72 is located within the multifunction baffle 40 and rotationally affixed to the output shaft 48. Specifically, the output gear 72 is positioned about an intermediate portion 74 of the output shaft 48 between a first or forward terminal end 76 and a second or aft terminal end 78 of the shaft 48. When rotationally driven, the output shaft 48 rotates about a rotational axis. This axis is represented by an arrow 80 in FIG. 3 and is referred to hereafter as the "output axis 80." As previously noted, two rolling element (e.g., roller) bearings 52 are disposed around the output shaft 48 to facilitate rotation of the shaft 48 about the output axis 80. The leftmost bearing 52 is mounted between an outer periphery of the output shaft 48 and an inner periphery of an inwardly-protruding conical structure or annular boss 82 formed in the forward housing piece 44. The outer ring of the leftmost or forward bearing 52 is received by or pilots against a circumferential cup 84 formed in the annular boss 82, which circumscribes a central opening 86 provided through the boss 82. The end portion 76 of the output shaft 48 projects through the central opening 86 for mechanical connection to corresponding rotating component from the exterior of the gearbox housing 42, 44. Similarly, the rightmost bearing 52 is mounted between an outer periphery of the output shaft 48 and an inner periphery of an annular boss 88 formed in the aft housing piece 42, which extends inwardly toward the multifunction baffle 40. The outer ring of the rightmost bearing 52 seats in a circumferential cup 90, which circumscribes a central opening 92 provided through the annular boss 88. The end portion 78 of the output shaft 48 projects through this opening 92 for mechanical connection from the exterior of the gearbox housing 42, 44.

To deliver lubricant into the interior of the multifunction baffle 40, at least one lubricant distribution channel 94, 96 may be formed in the output shaft 48. The lubricant distribution channel 94, 96 includes a channel inlet 98 formed in the forward end portion 76 of the output shaft 48, and a channel outlet 100 formed in the intermediate portion 74 of the shaft 48. The channel inlet 98 is fluidly connected to a longitudinally-extending segment 94 of the lubricant distribution channel 94, 96, which is, in turn, fluidly coupled to the channel outlet 100 by a radially-extending segment 96 of the channel 94, 96. The multifunction baffle 40 circumscribes the intermediate portion 74 of the output shaft 48 in which the channel outlet 100 is formed. Further, the interior cavity of the multifunction baffle 40 may be substantially co-axial with the output shaft 48 and the enclosed gear 72. Consequently, lubricant conducted through the lubricant distribution channel 94, 96 is directed into the interior of the multifunction baffle 40 to provide lubrication to the enclosed rotating gear 72, the aft bearing 52, and any other rotating components contained within the baffle 40. Lubricant flow through the lubricant distribution channel 94, 96 may occur due, at least in part, to centrifugal forces acting on lubricant within radially-extending segment 96 during high speed rotation of the output shaft 48. Lubricant may reach the inlet 98 of the lubricant distribution channel 94, 96, and/or flow into the forward bearing 52, by gravity downflow through one or more channels 102 formed in an upper portion of the annular boss 82 in embodiments.

Figure 4:
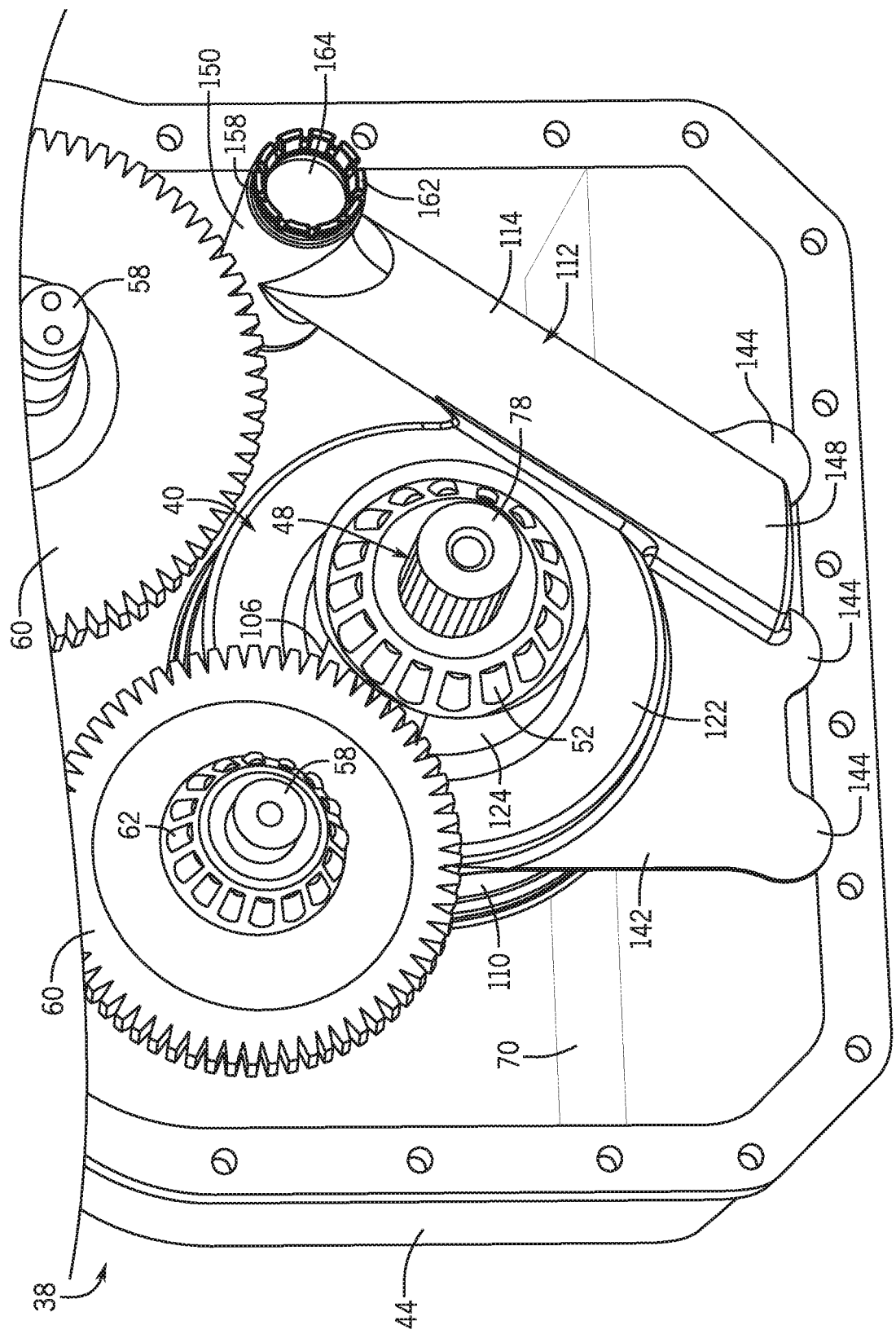
FIGS. 4 and 5 are isometric views of the transmission gearbox (partially shown) and the multifunction baffle, as depicted for visualization.
Figure 5:
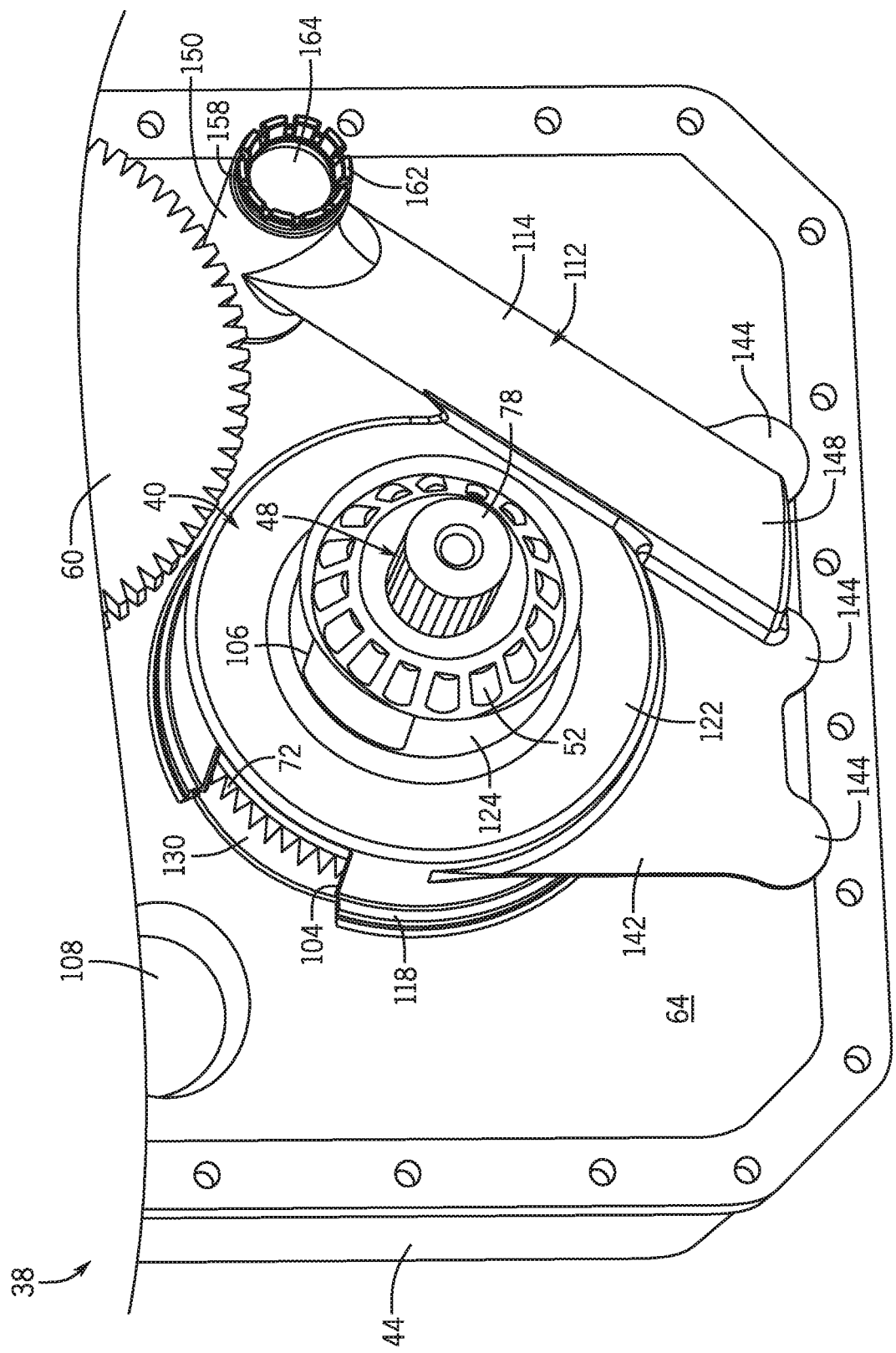
Figure 6:
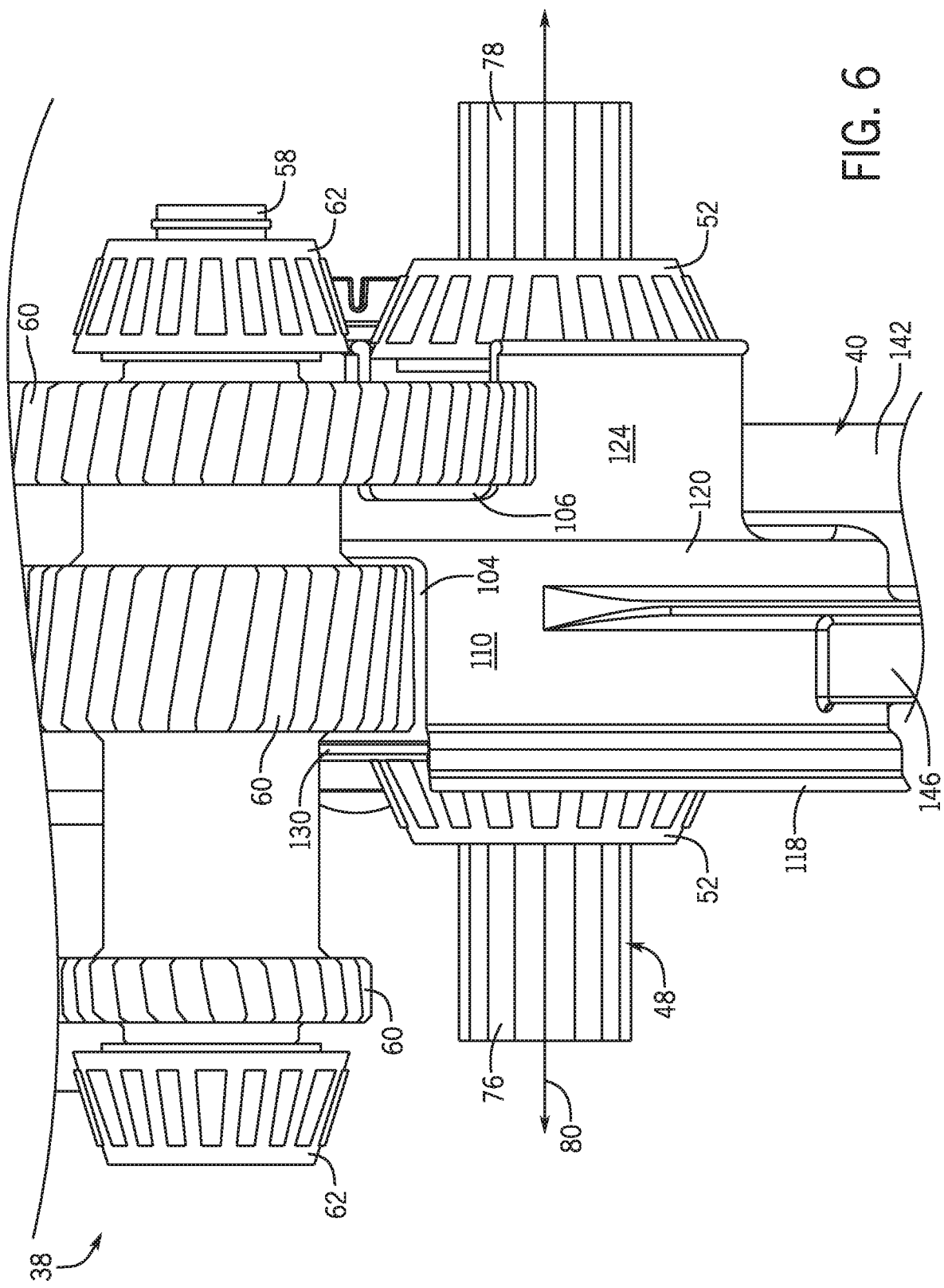
FIG. 6 is a side view of the multifunction baffle and the gearbox gear train, shown with the gearbox housing hidden from view.

Referring also to FIGS. 4-6, any number of peripheral openings or windows 104, 106 may be formed in the multifunction baffle 40 to, for example, permit the engagement of gear(s) external to the multifunction baffle 40 with the gear 72 or gear(s) enclosed by the baffle 40. In the illustrated example, specifically, the multifunction baffle 40 includes two such windows 104, 106, which are referred to below as a "shroud window 104" and as a "collar window 106," respectively. As shown most clearly in FIGS. 5 and 6, the output gear 72 enclosed by the multifunction baffle 40 is engaged through the shroud window 104 by one of the intermediate-stage gears 60 within the transmission gearbox 38. During assembly of the transmission gearbox 38, the output gear 72 and the multifunction baffle 40 may initially be installed within the forward housing 44, as shown. Afterwards, the intermediate-stage gear 60 engaging the output gear 72, and the shaft 58 supporting this gear 60, may be installed in the forward housing piece 44. In so doing, the forward bearing 62 supporting the shaft 48 may be matingly inserted into a cylindrical cavity 108 (FIG. 5) provided in the forward housing piece 44.

Figure 7:
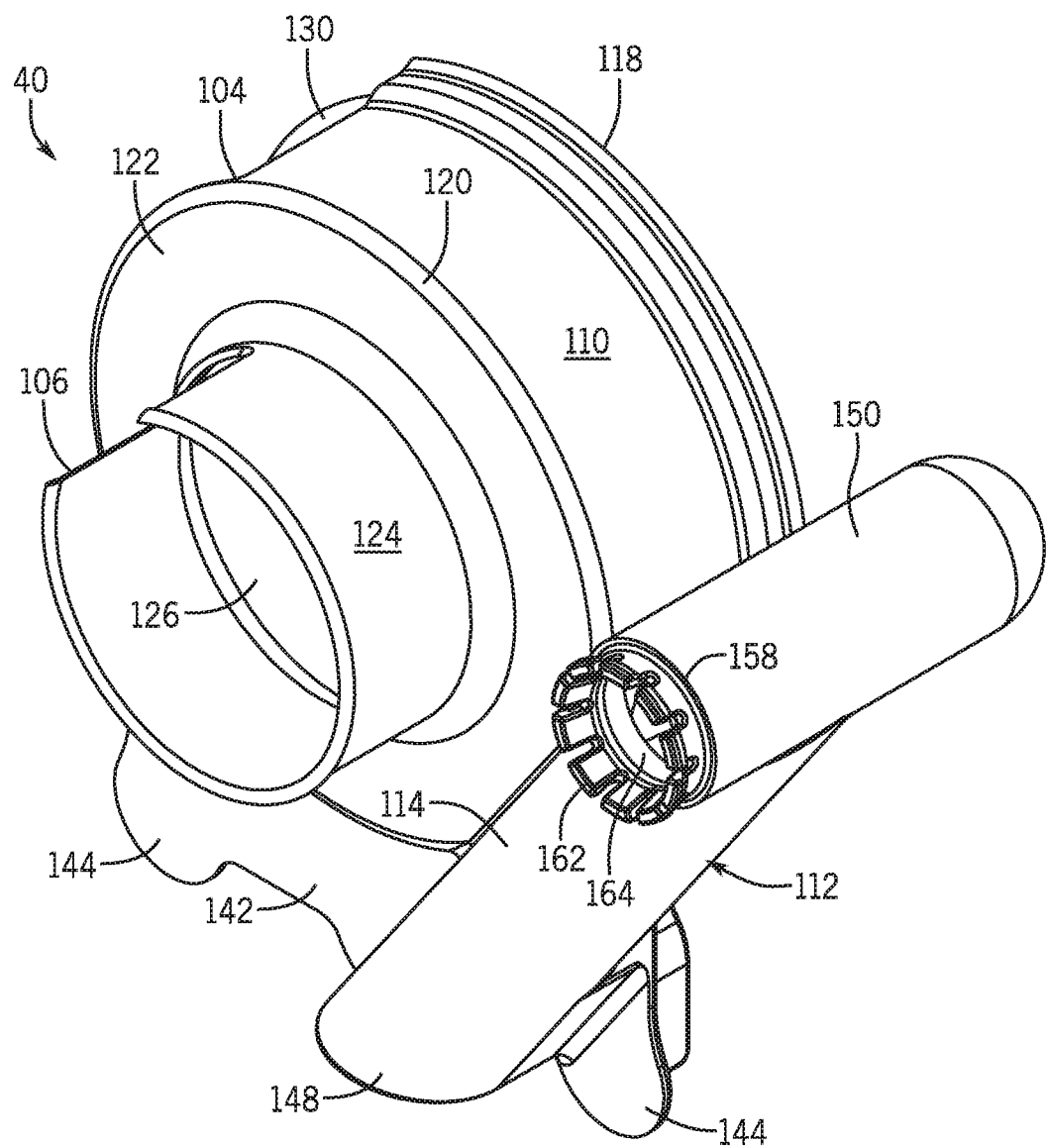
FIGS. 7 and 8 are rear and front isometric views, respectively, of the example multifunction baffle.
Figure 8:
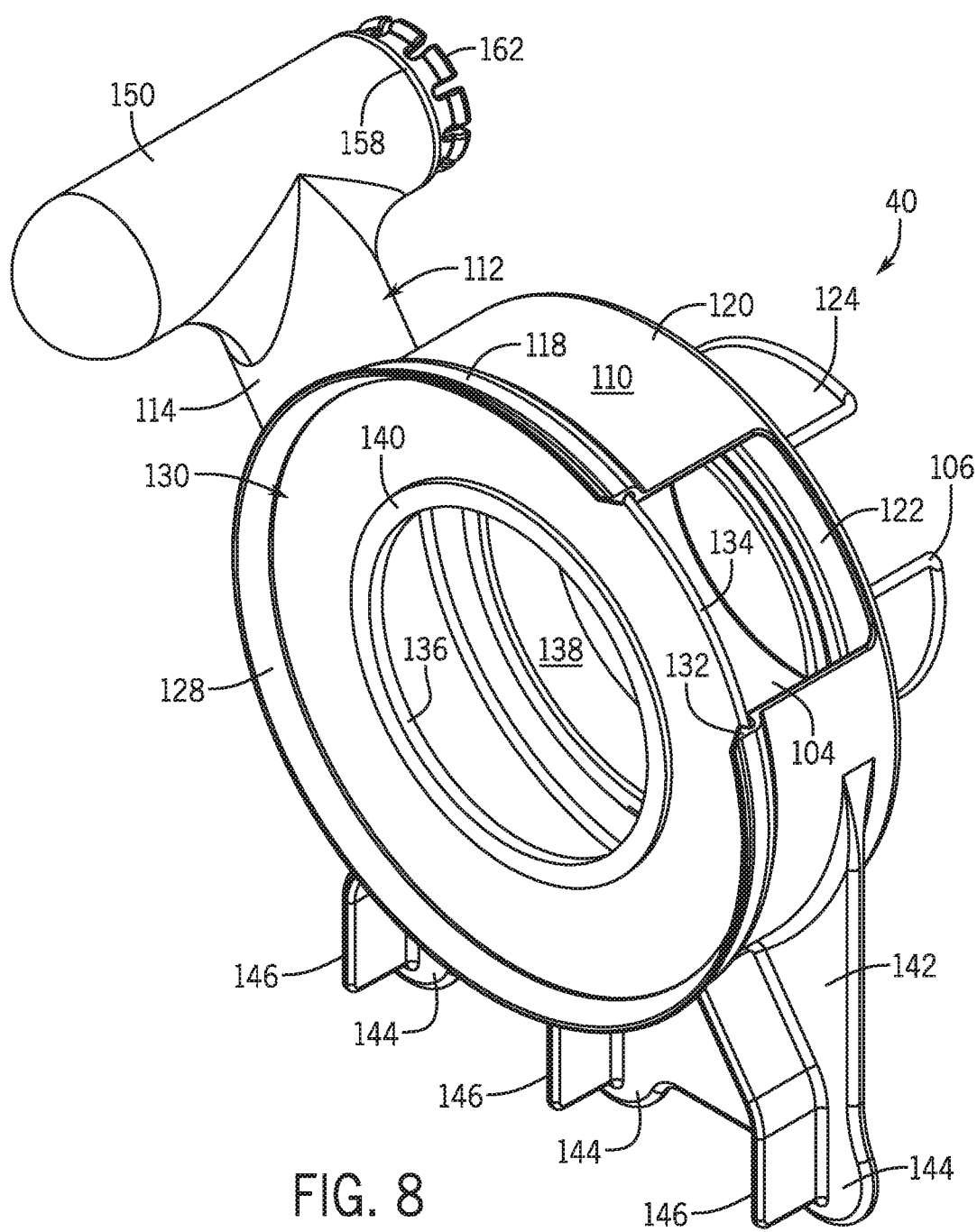
Figure 9:
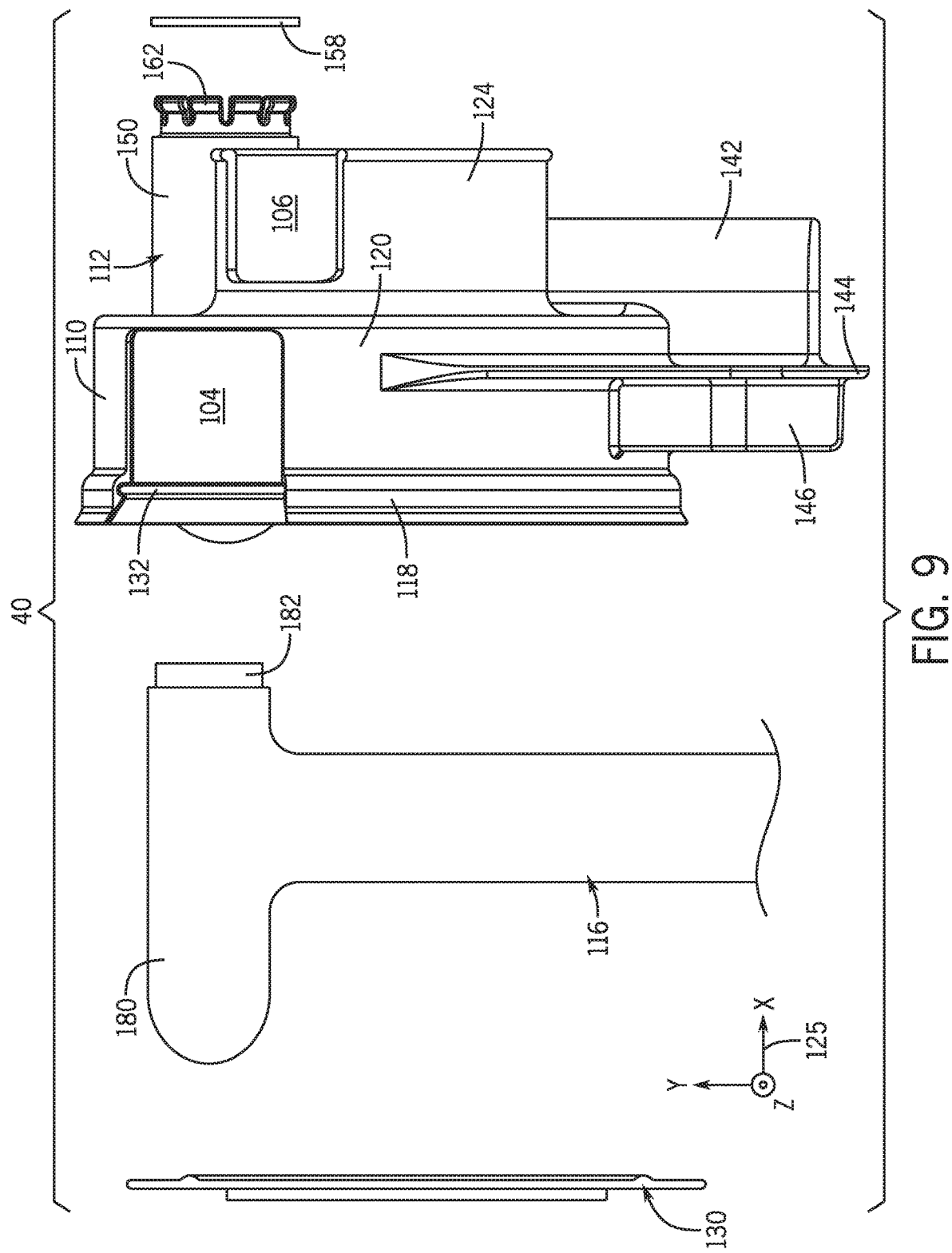
FIG. 9 is an exploded view of the multifunction baffle illustrating (from left to right) a cover piece, a suction tube liner, a main baffle body, and an O-ring, which may be included in the multifunction baffle in an embodiment.

Turning now to FIGS. 7-9, the example multifunction baffle 40 will be described in greater detail. In addition to the above-mentioned windows 104, 106, the multifunction baffle 40 further includes, as principal features, a circumferential shroud wall 110 and a suction tube 112 having an outer tube wall or body 114. In various embodiments, a substantial portion, if not the entirety of the suction tube body 114 may be integrally formed with the circumferential shroud wall 110 as a single part or monolithic piece. In such embodiments, the suction tube 112 may be more specifically referred to as an "integrated suction tube 112." Further, as the suction tube body 114 is integrally formed with the circumferential shroud wall 110 as a single piece in the illustrated embodiment, this terminology is utilized below in reference to the suction tube 112. The instant example notwithstanding, the suction tube body 114 need not be integrally formed with the circumferential shroud wall 110 in all implementations of the multifunction baffle 40. Additionally, even when the outer tubular body 114 of the suction tube 112 is integrally formed with the circumferential shroud wall 110 as a single piece, the suction tube 112 may further include one or more additional, separately-fabricated components, such as an embedded suction tube liner 116 as discussed more in connection with FIG. 9.

Referring collectively to FIGS. 3-9, the circumferential shroud wall 110 of the multifunction baffle 40 may assume the form of a substantially tubular or tunnel-shaped structure having a forward peripheral edge 118 and an opposing, aft peripheral edge 120. In the illustrated implementation, the main body of the multifunction baffle 40 is not entirely defined by the circumferential shroud wall 110, but rather further includes an annular endwall 122 and a tubular extension or collar 124. The annular endwall 122 extends from the aft peripheral edge 120 of the circumferential shroud wall 110 in a radially-inward direction. The term "radial," as appearing herein, refers to a direction perpendicular to the centerline of the multifunction baffle 40, which corresponds to the Y-axis of coordinate legend 125 appearing in the lower left corner of FIG. 9. Comparatively, the tubular collar 124 projects from the annular endwall 122 in an axial direction opposite the circumferential shroud wall 110; that is, in an aftward direction in the illustrated example. The term "axial," as further appearing herein, refers to a direction parallel to the centerline of the multifunction baffle 40, which corresponds to the X-axis of coordinate legend 125. The tubular collar 124 may further help maintain part spacing and prevent undesired contact or rubbing between rotating and static components within the transmission gearbox 38. Additionally, as noted above, a clearance or buffer is provided between the enclosed gear 72 and the endwall 122. A lower portion of the annular endwall 122 may also serve as a dam feature or retention wall preventing the lower interior of the multifunction baffle 40 (defined by a lower portion of the circumferential shroud wall 110 and located within the lubricant reservoir 70) from filling with a pool of lubricant. This, along with relatively tight dimensioning of the multifunction baffle 40 relative to the enclosed gear 72, may reduce eliminating windage of the gear 72 during operation of the work equipment transmission gearbox 38.

As labeled in FIG. 7, a central opening 126 is formed in the annular endwall 122 and connects the main interior compartment or cylindrical cavity of the multifunction baffle 40 (that is, the interior portion of the baffle 40 circumscribed by the circumferential shroud wall 110) with the smaller interior compartment of the baffle 40 (that is, the interior portion of baffle 40 circumscribed by the tubular extension or collar 124). When the multifunction baffle 40 is installed within the transmission gearbox 38, the output shaft 48 extends through the central opening 126, as well as through the open forward and aft ends of the baffle 40. Further, when the transmission gearbox 38 is assembled, the forward peripheral edge portion 118 of the circumferential shroud wall circumscribes or extends around a forward-facing opening 128 of the baffle 40, as identified in FIG. 8. An interchangeable adapter collar or piece 130 may be received through this forward-facing opening 128 in a mating or close-fit relationship. The annular cover piece 130 may be retained within the circumferential shroud wall 110 by, for example, engagement with an inner peripheral recess or groove 132 (or other retention scheme) provided around an interior of the circumferential shroud wall 110, as described more fully below.

The annular cover piece 130 has a disc-like or plate-like form factor in the illustrated example. As further identified in FIG. 8, the plate-like body of the cover piece 130 includes an outer peripheral edge 134, an inner peripheral edge 136, and a central opening 138 defined by the inner peripheral edge 136. Additionally, an inner annular rim 140 projects from the inner peripheral edge 136 of the cover piece 130 in an axial direction (specifically, in a forward direction) from the inner peripheral edge 136 of the cover piece 130. As shown in FIG. 3, the inner annular rim 140 matingly engages or registers to a corresponding raised rim or lip 141 provided around the annular boss 82 of the forward housing piece 44 when the multifunction baffle 40 is installed within the gearbox transmission gearbox 38; e.g., the inner annular rim 140 of the cover piece 130 may be received within the protruding annular lip 141 of the boss 82, which is co-axial with the rim 140 and output axis 80. The mating interface between the inner annular rim 140 and the annular lip 141 thus positions the annular cover piece 130 relative to the boss 82 to helps maintain proper positioning of the multifunction baffle 40 within the gearbox housing 42, 44. In other embodiments, a different attachment arrangement may be utilized. The annular cover piece 130 is thus located between the annular boss 82 and the output gear 72, as taken along the output axis 80.

As previously indicated, the outer peripheral edge 134 of the annular cover piece 130 may be received within the inner peripheral groove 132 (labeled in FIG. 8) provided around the interior of the circumferential shroud wall 110. In further implementations, various other attachment schemes can be employed for joining the aforementioned components in a desired manner. For example, the cover 130 may be retained within the baffle 40 utilizing a snap ring in further embodiments (compression then providing permanent retention within the housing). Generally, the baffle 40 may be assembled the shaft 48 with the cover 130 before positioning in the housing 82.

The multifunction baffle 40 further includes a foot or base portion 142 located beneath the circumferential shroud wall 110. When the multifunction baffle 40 is installed in the transmission gearbox 38, the base portion 142 engages a floor of the gearbox housing 42, 44 to provide a vertical standoff. The baffle 40 may provide such a vertical standoff due, at least in part, to its rigidity and positioning provided by the co-axial features and the suction tube 112. Additionally, the base portion 142 may add rigidity to the multifunction baffle 40, while helping position the baffle 40 within the gearbox housing 42, 44. In this regard, the multifunction baffle 40 may include a number of extensions or tabs 144, which project from the base portion 142. The tabs 144 are matingly received by one or more recesses or slots formed in the gearbox housing 42, 44. For example, as most readily observed in FIG. 3, the tabs 144 may be received in one or more slots formed at the interface of the forward housing piece 44 and the aft housing piece 42 when assembled to yield the gearbox housing 42, 44. In the illustrated example, the multifunction baffle 40 includes three such tabs 144, which are laterally spaced along a bottom edge of the base portion 142. If desired, a number of stiffening ribs 146 (FIG. 8) may further be included in the baffle 40 and extend from the circumferential shroud wall 110 downwardly to the tabs 144 for added structural integrity. Additionally, the stiffening ribs 146 may terminate at and abut the floor of the sump 64, 66 when the multifunction baffle 40 is installed in the transmission gearbox 38.

Figure 10:
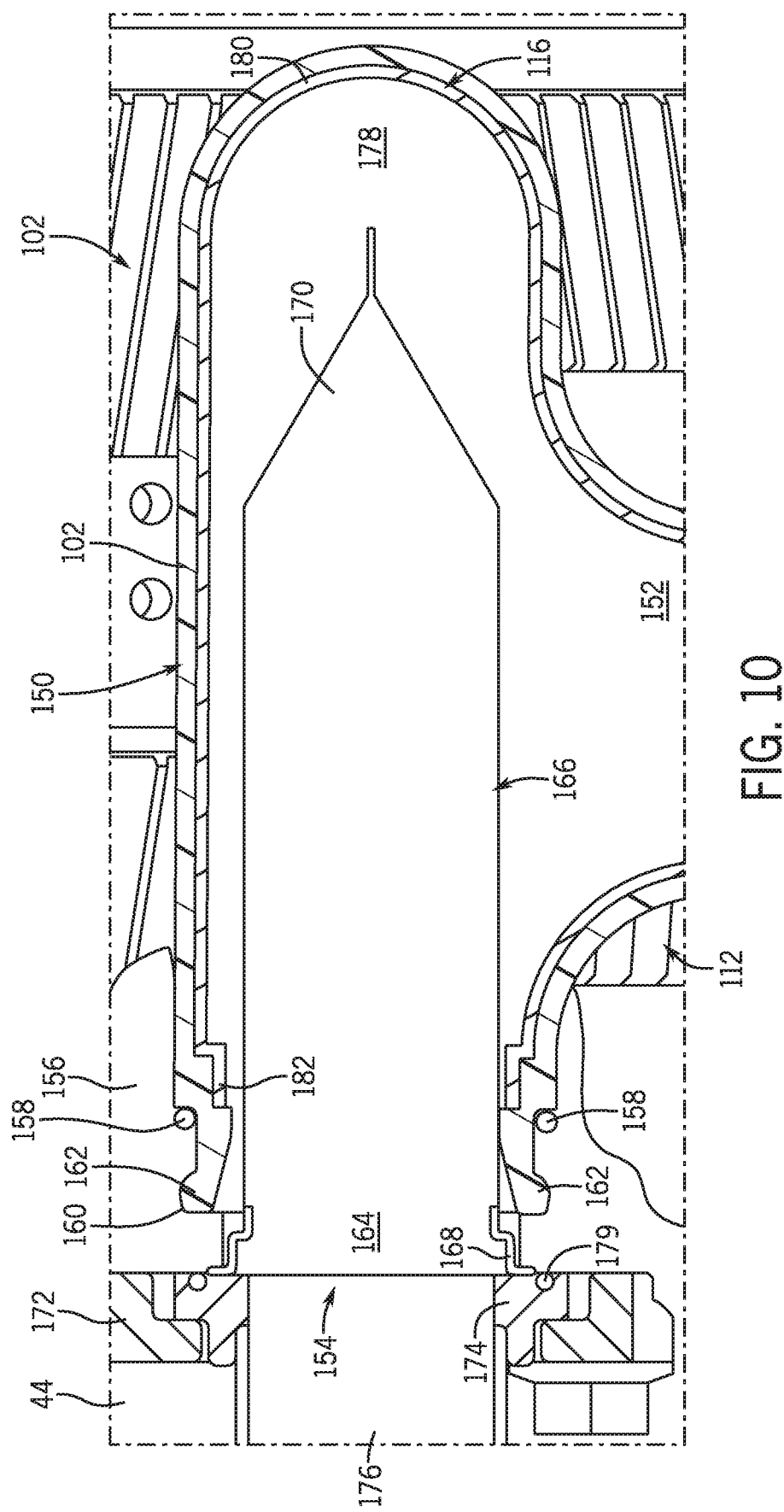
FIG. 10 is a cross-sectional view of the outlet end portion of the integral suction tube included in the multifunction baffle, showing one manner in which the outlet end portion of the suction tube may engage into the outlet port of the gearbox housing (the outlet port containing a screen accessible without opening the transmission housing)

A more detailed discussion of the integrated suction tube 112 will now be provided with reference to FIG. 10 in combination with FIGS. 3-9. In addition to the outer wall or suction tube body 114, the integrated suction tube 112 includes the following principal features: an inlet end portion 148, an outlet end portion 150, and a lubricant flow passage 152 extending within the suction tube body 114 from the inlet end portion 148 to the outlet end portion 150. The inlet end portion 148 of the integrated suction tube 112 may be located adjacent the base portion 142 and retention tabs 144 of the multifunction baffle 40. When the multifunction baffle 40 is installed within the gearbox housing 42, 44, and when the sump 64, 66 is filled with a selected lubricant to form lubricant reservoir 70 (FIG. 4), the inlet end portion 148 of the integrated suction tube 112 is placed in fluid communication with the lubricant reservoir 70. Comparatively, the outlet end portion 150 of the integrated suction tube 112 is placed in fluid communication with an outlet port 154. During operation of the multifunction baffle 40, lubricant is drawn through lubricant flow passage 152 and removed from the gearbox housing 42, 44 through the outlet port 154 provided in a wall 156 of the aft housing piece 44. The outlet end portion 150 engages into, or is otherwise mechanically joined to, the outlet port 154 to provide a fluid-tight connection at this interface. Engagement of the outlet end portion 150 into the outlet port 154 may also serve as an anti-rotation feature, which, along with capture of the tabs 144 between the housing pieces 42, 44, helps prevent movement of the baffle 40 during high speed rotation of the output shaft 48 and the supported output gear 72.

To provide a secure, low leakage connection between the outlet end portion 150 of the integrated suction tube 112 and the outlet port 154, an annular seal (e.g., an O-ring 158) may be compressed between an outer surface of the outlet end portion 150 and the surfaces of the housing wall 156 defining the outlet port 154. Additionally, as shown in FIG. 10, an inner annular groove 160 may be provided around an interior periphery of the housing wall 156 defining the outlet port 154. A number of (e.g., resilient) registration features 162 may project from the outlet end portion 150 and engage into the inner annular groove 160 when the outlet end portion 150 is inserted into the outlet port 154. In embodiments, the registration features 162 assume the form of an annular array of spring fingers 162, which circumscribe a suction tube outlet port 164 provided in the outlet end portion 150 of the integrated suction tube 112. The spring fingers 162 may resiliently engage into the inner annular groove 160 when the outlet end portion 150 of the integrated suction tube 112 is pressed into the outlet port 154, as shown. This may ensure proper positioning of the integrated suction tube 112, while provide a secure, fastener-free connection between the outlet end portion 150 and the outlet port 154. Further, in certain implementations, the spring fingers 162 may be formed integrally with the suction tube body 114 and, perhaps, the circumferential shroud wall 110 as a single piece utilizing a molding process, additive manufacturing, or another manufacturing technique.

A tubular filter insert 166 can be installed in the outlet port 154 in the illustrated embodiment and extends through the suction tube outlet port 164 into the outlet end portion 150 of the integrated suction tube 112. The tubular filter insert 166 includes an elongated body having a flanged end portion 168 and an opposing tip portion 170. Perforations (not shown) are formed in the insert body to allow the passage of lubricant, while blocking the passage of larger debris or particles carried by the lubricant. A sealing assembly 172, 174 may be brazed or otherwise joined between a mating conduit 176 and the housing wall 156 in which the outlet port 154, with an O-ring 179 is further provided and compressed between an outer surface of the housing wall 156 and the sealing assembly 172, 174 for enhanced sealing.

The tubular filter insert 166 may have a length extending beyond the centerline of the flow passage 152 within the integrated suction tube 112 in certain embodiments. In this case, the outlet end portion 150 of the integrated suction tube 112 may be imparted with a geometry to accommodate the dimensions of the tubular filter insert 166. For example, as shown in FIG. 10, the outlet end portion 150 may be imparted with a T-shaped geometry including a blind lobe 178. The tip 170 of the tubular filter insert 166 may extend into the blind lobe 178 when the tubular filter insert 166 is inserted into the outlet end portion 150. In other embodiments, the tubular filter insert 166 may be replaced by a different type of filter element or may have a length rendering the blind lobe 178 unnecessary. As a further possibility, such a filter element may be omitted at the interface between the outlet end portion 150 of the integrated suction tube 112 and the outlet port 154 provided in the gearbox housing 42, 44. The foregoing notwithstanding, any or all of the above-described features may be omitted in further embodiments of the multifunction baffle 40.

As previously noted, one or more discretely-fabricated suction tube liners 116 may be embedded in the body 114 of the integrated suction tube 112. When such a suction tube liner 116 is present, the interior surfaces of the suction tube liner 116 may define a substantial portion of the lubricant flow passage 152. Provision of the suction tube liner 116 may thus help ensure that the suction tube 112 is imparted with an air-tight construction along its length to minimize or eliminate air entrapment in the lubricant extracted through the suction tube 112. To best provide this functionality, the suction tube liner 116 may extend within the main body 114 of the integrated suction tube 112 from the inlet end portion 148 to the outlet end portion 150 of the integrated suction tube 112. Additionally, the suction tube liner 116 may have a geometry generally corresponding to that of the suction tube body 114 including, for example, a T-shaped upper end portion 180 embedded within the outlet end portion 150 of the integrated suction tube 112. The suction tube liner 116 may further include a stepped terminal end 182, which terminates proximate the suction tube outlet port 164 at a location adjacent the spring fingers 162. In other embodiments, the suction tube liner 116 may be omitted; e.g., if there is not a parting line extending through the suction tube 114.

When included in the multifunction baffle 40, the suction tube liner 116 may be fabricated utilizing different production techniques including by injection molding, thermal forming, or additive manufacturing. In certain embodiments, the main body of the multifunction baffle 40 (e.g., including the circumferential shroud wall 110, the annular endwall 122, the tubular collar 124, and the tube body 114 of the integrated suction tube 112) may be fabricated as a single piece (e.g., by molding or additive manufacturing) from a first material. By comparison, the suction tube liner 116 may be fabricated from a second material different than the first material. In embodiments in which geometry permits, the suction tube liner 116 may be fabricated separately from the main body of the baffle and subsequently installed in the suction tube flow passage 152 by, for example, press-fit. Alternatively, the main body of the multifunction baffle 40 may be formed over and around the suction tube liner 116 utilizing, for example, an insert- or over-molding technique. In such embodiments, the suction tube liner 116 may be composed of a first material, such as a first thermoplastic, having a first melt point. The main body of the multifunction baffle 40 may then be over-molded (or "insert molded") over and around the suction tube liner 116 from a second material, such as a second thermoplastic. The second material may be selected to have a second melt point less than the first melt point to prevent undesired reflow of the suction tube liner 116 during the over-molding process. In certain embodiments, all of the features described above with the exception of the cover piece 130 may be integrally formed as a single molded piece when over-molded over and around the embedded suction tube liner 116. The suction tube liner 116 may also simplify the over-molding process by helping to define the lubricant flow passage 152 provided within the integrated suction tube 112. These advantages notwithstanding, the multifunction baffle 40 may lack the suction tube liner 116 and/or the main body of the multifunction baffle 40 can be produced in another manner, such as by three-dimensional printing, in further embodiments.

Embodiments of the multifunction baffle 40 may permit the tubular cover piece 130 to be freely interchanged with other cover pieces of varying dimensions and geometries. Each cover piece may be sized and shaped for matingly engagement with the main body of the multifunction baffle 40; e.g., by engagement with the inner peripheral groove 132 provided about an interior of the circumferential shroud wall 100. This enables the cover piece 130 to be interchanged or "swapped" with other cover pieces of varying dimensions to allow usage of the multifunction baffle 40 across multiple work equipment transmission platforms. The interchange nature of the cover piece 130 will now be discussed in connection with FIG. 11.

Figure 11:
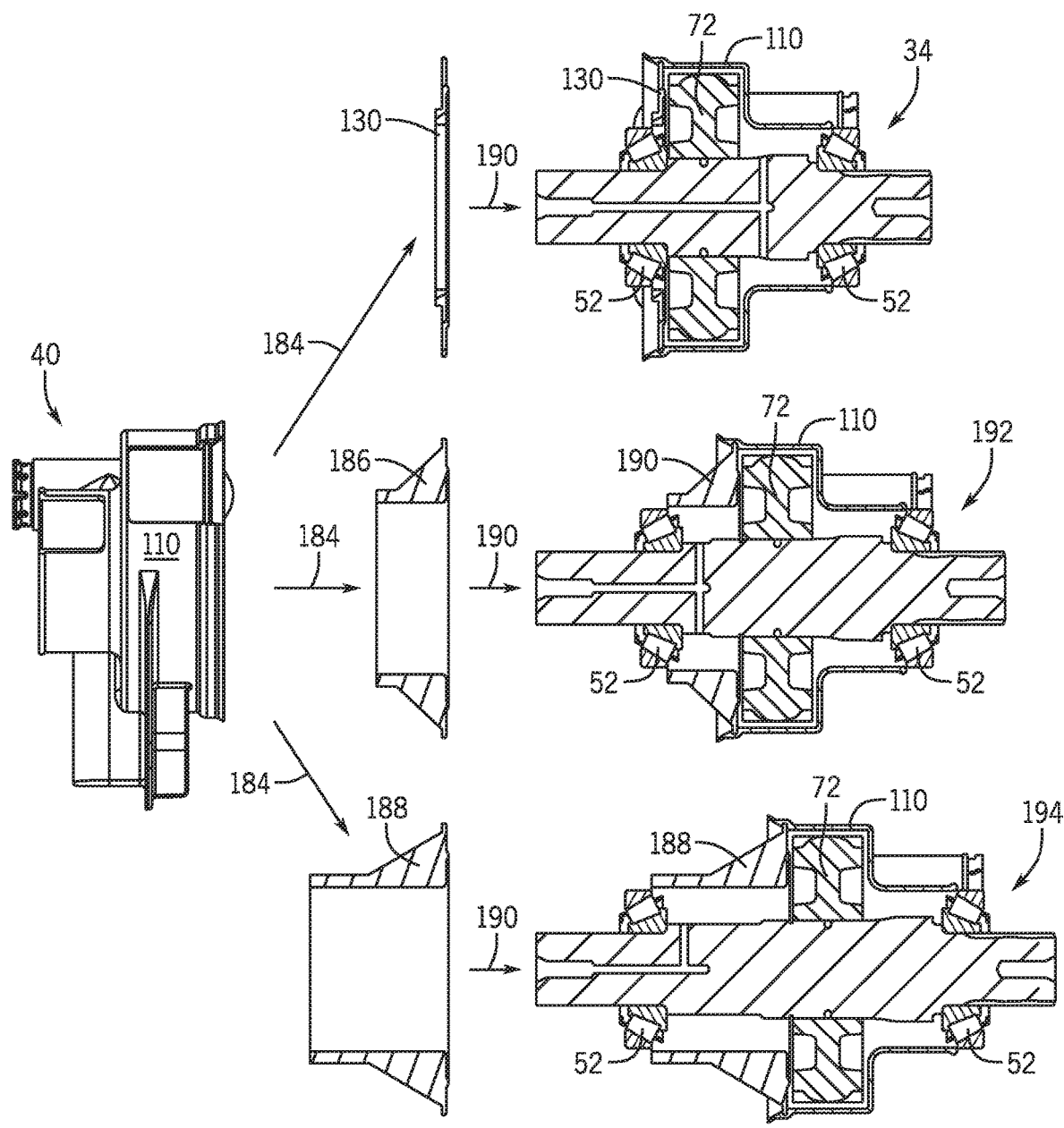
FIG. 11 is a schematic illustrating one manner in which the cover piece of the multifunction baffle may be interchanged with other cover pieces of varying sizes to enable the usage of the multifunction baffle across multiple work equipment (e.g., vehicle) transmission platforms.

In the example of FIG. 11, and as indicated by arrows 184 at least three different cover pieces 130, 186, 188 can be utilized in conjunction with the multifunction baffle 40. While only three cover pieces 130, 186, 188 are shown (including the relatively-thin, plate-like cover piece 130 previously shown in FIGS. 3-10 and depicted in the upper row of FIG. 11), any practical number and type of cover pieces can be utilized in conjunction with the multifunction baffle 40. The cover pieces 130, 186, 188 differ in geometry and dimensions (primarily lengths), but each have an outer peripheral edge sized and shaped for mating insertion into the open end of circumferential shroud wall 110, as previously described. As indicated by arrows 190, the multifunction baffle 40 may be installed within a first type of transmission gearbox (namely, the transmission gearbox 38 described above in connection with FIGS. 2-10) when assembled to include the smaller, plate-like cover piece 130. In this case, the length of the cover piece 130 may be sufficiently limited such that the forward bearing 52 partially nests within the circumferential shroud wall 110 as shown. When instead assembled to include the mid-size cover piece 186, the multifunction baffle 40 may be utilized within a second type of transmission gearbox 192, as partially shown in the middle row of FIG. 11. In this case, a greater axial spacing is provided between the forward bearing 52 and the enclosed gear 72. Finally, when utilized with the large cover piece 188, the multifunction baffle 40 may be installed with a third type of transmission gearbox 194 (partially shown in cross-section in the bottom row of FIG. 11), with the greatest axial spacing provided between the forward bearing 52 and the enclosed gear 72. Such interchangeability of the cover pieces 130, 186, 188 enables the usage of the multifunction baffle 40 across multiple work equipment transmission platforms for enhanced versatility and manufacturing cost reduction by large scale production.

Enumerated Examples of Work Equipment Tranmissions Containing Multifunction Baffles Also, the following examples are provided, which are numbered for ease of reference.

1. A work equipment (e.g., vehicle) transmission includes a gearbox housing having an outlet port, a sump within the gearbox housing and retaining a lubricant reservoir when filled with a lubricant, and a first gear mounted in the gearbox housing for rotation about a first axis. A portion of the first gear is located below an upper surface of the lubricant reservoir. A multifunction baffle, which is installed within the gearbox housing, includes: a circumferential shroud wall extending into the lubricant reservoir and at least partially around an outer periphery of the first gear, and an integrated suction tube. The integrated suction tube includes, in turn, a suction tube body integrally formed with the circumferential shroud wall, an inlet end portion in fluid communication with the lubricant reservoir, an outlet end portion in fluid communication with the outlet port, and a lubricant flow passage extending within the suction tube body from the inlet end portion to the outlet end portion and through which the lubricant is drawn from the lubricant reservoir.

2. The work equipment transmission of example 1, further including a second gear mounted in the gearbox housing for rotation about a second axis parallel with the first axis. Additionally, the multifunction baffle further includes a shroud window formed in the circumferential shroud wall and through which the second gear meshes with the first gear.

3. The work equipment transmission of example 1, wherein the multifunction baffle further includes: an annular endwall extending from a peripheral edge of the circumferential shroud wall in a radially-inward direction, a central opening formed in the annular endwall, and a tubular collar projecting from the annular endwall in an axial direction opposite the circumferential shroud wall.

4. The work equipment transmission of example 3, further including an output shaft to which the first gear is mounted in a rotationally-fixed relationship, the output shaft extending through the central opening formed in the annular endwall.

5. The work equipment transmission of example 3, wherein the annular endwall, the tubular collar, the circumferential shroud wall, and the suction tube body are integrally formed as a single molded piece.

6. The work equipment transmission of example 3, further including a collar window formed in the tubular collar and positioned to allow lubricant flow into the tubular collar from above the multifunction baffle during operation of the work equipment transmission.

7. The work equipment transmission of example 6, further including: a shaft to which the second gear is mounted in a rotationally-fixed relationship, and a third gear mounted to the shaft and having a lower portion extending into the collar window.

8. The work equipment transmission of example 1, wherein the gearbox housing includes a forward housing piece and an aft housing piece, which is mated to the forward housing piece when the gearbox housing is assembled. Also, the multifunction baffle further includes a base portion beneath the circumferential shroud wall and integrally formed therewith and at least one tab projecting from the base portion. The at least one tab is captured between the forward housing piece and the aft housing piece to restrict movement of the multifunction baffle within the gearbox housing.

9. The work equipment transmission of example 1, wherein the suction tube body is composed of a first material. Additionally, the multifunction baffle further includes a suction tube liner embedded within the suction tube body, defining at least a portion of the lubricant flow passage, and composed of a second material different than the first material.

10. The work equipment transmission of example 9, wherein the suction tube body is over-molded around the suction tube liner, while the second material has a melt point higher than that of the first material.

11. The work equipment transmission of example 1, wherein the outlet end portion of the integrated suction tube includes: a lubricant outlet through which the lubricant is discharged from the multifunction baffle, and at least one resilient feature integrally formed with the suction tube body adjacent the lubricant outlet and engaged into the outlet port.

12. The work equipment transmission of example 11, wherein the at least one resilient feature includes a plurality of resilient fingers distributed around the lubricant outlet. Further, the lubricant output port includes an annular groove in which the plurality of resilient fingers register when the outlet end portion of the integrated suction tube is inserted into the lubricant output port.

13. The work equipment transmission of example 1, further including a shaft to which the first gear is mounted in a rotationally-fixed relationship. Moreover, the multifunction baffle further includes an annular cover piece circumscribed by the circumferential shroud wall and having a central opening through which the shaft extends.

14. The work equipment transmission of example 13, wherein the multifunction baffle further includes an inner peripheral groove formed in an inner surface of the circumferential shroud wall. The annular cover piece has an outer peripheral edge received within the inner peripheral groove when the annular cover piece is positioned within the circumferential shroud wall.

15. The work equipment transmission of example 13, wherein the gearbox housing includes a forward housing piece having an annular boss to which the shaft is rotatably mounted, the annular cover piece located between the annular boss and the first gear as taken along the first rotational axis. The annular cover piece has an annular lip extending around the central opening and engaging the annular boss to position the annular cover piece relative to the annular boss.

CONCLUSION

There has thus been provided embodiments of work equipment (e.g., vehicle) transmission gearboxes containing multifunction baffles, which concurrently serve multiple key purposes or fundamental functions within the gearboxes. In certain embodiments, the multifunction baffle may include an integrally-formed suction tube for conducting oil or another lubricant from a lubricant reservoir to outlet port in an efficient manner, while minimizing the entrapment of air within the extracted lubricant stream. The suction tube may include molded spring fingers or similar resilient features, which register into an outlet port provided in the gearbox housing, to ensure provide robust sealing and decrease part count. The entirety or a substantial portion of the suction tube of the multifunction baffle may be integrally formed with other features of the baffle (e.g., a circumferential shroud wall, retention tabs, a tubular collar, and/or am annular endwall) as a single piece in embodiments. Further, in certain implementations, a suction tube liner may be embedded within the body of the integrated suction tube to further promote high integrity sealing of the suction tube. Finally, embodiments of the multifunction baffle may include an interchangeable cover or adapter piece facilitating adaptability or versatility of the baffle for usage across a multitude of work equipment transmission platforms.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work equipment transmission, comprising:
a gearbox housing having an outlet port;
a sump within the gearbox housing and retaining a lubricant reservoir when filled with a lubricant;
a first gear mounted to a shaft in the gearbox housing for rotation about a first axis, a portion of the first gear located below an upper surface of the lubricant reservoir; and
a multifunction baffle installed within the gearbox housing, the multifunction baffle comprising:
a circumferential shroud wall extending into the lubricant reservoir and at least partially around an outer periphery of the first gear; and
an integrated suction tube including a suction tube body integrally formed with the circumferential shroud wall, an inlet end portion in fluid communication with the lubricant reservoir, an outlet end portion in fluid communication with the outlet port, a lubricant flow passage extending within the suction tube body from the inlet end portion to the outlet end portion and through which the lubricant is drawn from the lubricant reservoir, and an annular cover piece circumscribed by the circumferential shroud wall and having a central opening through which the shaft extends.

2. The work equipment transmission of claim 1, further comprising a second gear mounted in the gearbox housing for rotation about a second axis parallel with the first axis;
wherein the multifunction baffle further comprises a shroud window formed in the circumferential shroud wall and through which the second gear meshes with the first gear.

3. The work equipment transmission of claim 1, wherein the multifunction baffle further comprises:
an annular endwall extending from a peripheral edge of the circumferential shroud wall in a radially-inward direction;
a central opening formed in the annular endwall; and
a tubular collar projecting from the annular endwall in an axial direction opposite the circumferential shroud wall.

4. The work equipment transmission of claim 3, further comprising an output shaft to which the first gear is mounted in a rotationally-fixed relationship, the output shaft extending through the central opening formed in the annular endwall.

5. The work equipment transmission of claim 3, wherein the annular endwall, the tubular collar, the circumferential shroud wall, and the suction tube body are integrally formed as a single molded piece.

6. The work equipment transmission of claim 3, further comprising a collar window formed in the tubular collar and positioned to allow lubricant flow into the tubular collar from above the multifunction baffle during operation of the work equipment transmission.

7. The work equipment transmission of claim 6, further comprising:
a shaft to which the second gear is mounted in a rotationally-fixed relationship; and
a third gear mounted to the shaft and having a lower portion extending into the collar window.

8. A work equipment transmission, comprising:
a gearbox housing having an outlet port;
a sump within the gearbox housing and retaining a lubricant reservoir when filled with a lubricant;
a first gear mounted in the gearbox housing for rotation about a first axis, a portion of the first gear located below an upper surface of the lubricant reservoir; and
a multifunction baffle installed within the gearbox housing, the multifunction baffle comprising:
a circumferential shroud wall extending into the lubricant reservoir and at least partially around an outer periphery of the first gear; and
an integrated suction tube including a suction tube body integrally formed with the circumferential shroud wall, an inlet end portion in fluid communication with the lubricant reservoir, an outlet end portion in fluid communication with the outlet port, and a lubricant flow passage extending within the suction tube body from the inlet end portion to the outlet end portion and through which the lubricant is drawn from the lubricant reservoir;
wherein the gearbox housing further comprises:
a forward housing piece; and
an aft housing piece mated to the forward housing piece when the gearbox housing is assembled; and
wherein the multifunction baffle further comprises:
a base portion beneath the circumferential shroud wall and integrally formed therewith; and a tab projecting from the base portion, the tab captured between the forward housing piece and the aft housing piece to restrict movement of the multifunction baffle within the gearbox housing.

9. A work equipment transmission, comprising:
a gearbox housing having an outlet port;
a sump within the gearbox housing and retaining a lubricant reservoir when filled with a lubricant;
a first gear mounted in the gearbox housing for rotation about a first axis, a portion of the first gear located below an upper surface of the lubricant reservoir; and
a multifunction baffle installed within the gearbox housing, the multifunction baffle comprising:
a circumferential shroud wall extending into the lubricant reservoir and at least partially around an outer periphery of the first gear; and
an integrated suction tube including a suction tube body integrally formed with the circumferential shroud wall, an inlet end portion in fluid communication with the lubricant reservoir, an outlet end portion in fluid communication with the outlet port, and a lubricant flow passage extending within the suction tube body from the inlet end portion to the outlet end portion and through which the lubricant is drawn from the lubricant reservoir;
wherein the suction tube body is composed of a first material; and
wherein the multifunction baffle further comprises a suction tube liner embedded within the suction tube body, defining at least a portion of the lubricant flow passage, and composed of a second material different than the first material.

10. The work equipment transmission of claim 9, wherein the suction tube body is over-molded around the suction tube liner; and
wherein the second material has a melt point higher than that of the first material.

11. The work equipment transmission of claim 1, wherein the outlet end portion of the integrated suction tube comprises:
a lubricant outlet through which the lubricant is discharged from the multifunction baffle; and
a resilient feature integrally formed with the suction tube body adjacent the lubricant outlet and engaged into the outlet port.

12. The work equipment transmission of claim 11, wherein the resilient feature comprises a plurality of resilient fingers distributed around the lubricant outlet; and
wherein the lubricant output port comprises an annular groove in which the plurality of resilient fingers register when the outlet end portion of the integrated suction tube is inserted into the lubricant output port.

13. The work equipment transmission of claim 1, wherein the multifunction baffle further comprises an inner peripheral groove formed in an inner surface of the circumferential shroud wall; and
wherein the annular cover piece comprises an outer peripheral edge received within the inner peripheral groove when the annular cover piece is positioned within the circumferential shroud wall.

14. The work equipment transmission of claim 1, wherein the gearbox housing comprises a forward housing piece having an annular boss to which the shaft is rotatably mounted, the annular cover piece located between the annular boss and the first gear as taken along the first rotational axis; and
wherein the annular cover piece comprises an annular lip extending around the central opening and engaging the annular boss to position the annular cover piece relative to the annular boss.

15. The work equipment transmission of claim 1, further comprising a lubricant distribution channel formed in the shaft, having an inlet formed in an end portion of the shaft, and having an outlet formed in an intermediate portion of the shaft; and
wherein the multifunction baffle circumscribes the intermediate portion of the shaft such that the lubricant, when directed through the lubricant distribution channel, is conducted into an interior of the multifunction baffle.

16. The work equipment transmission of claim 1, further comprising a tubular screen insert positioned in the outlet port and extending into the outlet end portion of the integrated suction tube;
wherein the outlet end portion of the integrated suction tube comprises:
a lubricant outlet in fluid communication with the outlet port; and
a blind lobe opposite the lubricant outlet and imparting the outlet end portion with a T-shaped geometry, the tubular screen insert extending through the lubricant outlet and into the blind lobe.

17. A work equipment transmission, comprising:
a gearbox housing having an outlet port;
a sump within the gearbox housing and retaining a lubricant reservoir when filled with a lubricant;
a first gear mounted in the gearbox housing for rotation about a first axis, a portion of the first gear located below an upper surface of the lubricant reservoir; and
a multifunction baffle installed within the gearbox housing, the multifunction baffle comprising:
a circumferential shroud wall extending into the lubricant reservoir and at least partially around an outer periphery of the first gear;
an annular endwall partially enclosing a first end portion of the circumferential shroud wall;
an annular cover piece matingly inserted into a second, opposing end portion of the circumferential shroud wall; and
a tubular collar projecting from the annular endwall in an axial direction opposite the circumferential shroud wall.

18. The work equipment transmission of claim 17, wherein the multifunction baffle further comprises a suction tube, the suction tube comprising:
a suction tube body integrally formed with the circumferential shroud wall;
an inlet end portion in fluid communication with the lubricant reservoir;
an outlet end portion in fluid communication with the outlet port; and
a lubricant flow passage extending within the suction tube body from the inlet end portion to the outlet end portion and through which the lubricant is drawn the lubricant reservoir during operation of the work equipment transmission.

19. A multifunction baffle for installation in a work equipment transmission including a gearbox housing having an outlet port, a sump within the gearbox housing and retaining a lubricant reservoir when filled with a lubricant, and a first gear mounted in the gearbox housing for rotation about a first axis at a location partially below an upper surface of the lubricant reservoir, the multifunction baffle comprising:
- a circumferential shroud wall extending into the lubricant reservoir and at least partially around an outer periphery of the first gear when the multifunction baffle is installed within the work equipment transmission; and
- an integrated suction tube, comprising:
  - a suction tube body integrally formed with the circumferential shroud wall;
  - an inlet end portion in fluid communication with the lubricant reservoir when the multifunction baffle is installed within the work equipment transmission;
  - an outlet end portion in fluid communication with the outlet port when the multifunction baffle is installed within the work equipment transmission, wherein the outlet end portion comprises:
    - a lubricant outlet through which the lubricant is discharged from the multifunction baffle; and
    - a resilient feature integrally formed with the suction tube body adjacent the lubricant outlet and engaged into the outlet port; and
  - a lubricant flow passage extending within the suction tube body from the inlet end portion to the outlet end portion and through which the lubricant is drawn the lubricant reservoir.

* * * * *